Patented June 18, 1946

2,402,481

UNITED STATES PATENT OFFICE 2,402,481

CATALYTIC POLYMERIZATION OF UNSATURATED ESTERS

David E. Adelson, Berkeley, Calif., Robert P. Ruh, Columbus, Ohio, and Harold F. Gray, Jr., Berkeley, Calif., assignors to Shell Development Company, San Francisco, Calif., a corporation of Delaware No Drawing. Application June 14, 1943, Serial No. 490,949

9 Claims. (Cl. 260—80)

This invention relates to a process for the catalytic polymerization of unsaturated esters. More particularly, the invention pertains to polymerization of allyl esters and related compounds, the polymerization being effected catalytically by the presence of a new class of polymerization catalysts consisting of certain metal salts.

Unsaturated esters of the type of allyl acetate, obtainable from a monocarboxylic acid which is devoid of any polymerizable unsaturated group and an unsaturated alcohol having an olefinic linkage between two carbon atoms one of which is directly linked to a saturated carbon atom having a hydroxyl group linked directly thereto, are compounds which may be termed difficultly polymerizable substances. While the action of heat, light or peroxidic substances has been used to obtain polymers from unsaturated esters of this type, none effects a rapid polymerization of the compounds and each of such catalysts is accompanied with certain disadvantages which are overcome by the present invention.

It is an object of the present invention to provide a method of polymerizing allyl acetate and related compounds.

Another object is to provide a process for obtaining polymers of unsaturated esters of the type of allyl acetate by employing as catalytic agent therefor a class of metal salts.

A further object is to provide a class of new polymerization catalysts.

These and other objects will be apparent from the description of the invention given hereinafter.

We have now discovered that allyl acetate and related compounds are catalytically polymerized when heated in the presence of a normal salt of an alkaline earth metal. By a "normal" salt, reference is made to those salts which are devoid of peroxidic oxygen in the acid portion of the salt as well as being neutral salts, i. e. acid salts are excluded. Thus the present invention does not employ, as catalyst, compounds which are known to the art as persalts, such as perborates, persulfates, etc. Our catalysts are normal salts, not persalts, of alkaline earth metals. The use of persalts which liberate oxygen when utilized give polymers wherein the monomer units of the polymer molecule contain oxygen linkages which are probably ethereal in nature rather than having the monomer units linked by carbon-to-carbon bonds.

Any alkaline earth metal salt of a normal acid is suitable as catalyst for use in the process, and the salts may be either of organic or inorganic acids. Representative salts include alkaline earth metal inorganic salts like the halides such as magnesium chloride, calcium chloride, barium chloride, beryllium bromide, barium fluoride, strontium iodide, calcium fluoride, radium chloride, barium bromide, strontium chloride, etc.; alkaline earth metal sulfates such as calcium sulfate, barium sulfate, etc.; alkaline earth metal carbonates such as beryllium carbonate, radium carbonate, calcium carbonate, barium carbonate, strontium carbonate, etc.; alkaline earth metal phosphates such as calcium phosphate, barium phosphate, magnesium phosphate, beryllium phosphate, etc.; alkaline earth metal nitrates such as calcium nitrate, strontium nitrate, barium nitrate, etc.; alkaline earth metal sulfites such as calcium sulfite, barium sulfite, etc.; alkaline earth metal cyanides such as magnesium cyanide, strontium cyanide, barium cyanide, etc.; as well as double salts like $Ca_5(PO_4)_3Cl$ or $Ca_5(PO_4)_3F$. Salts of organic acids also catalyze the polymerization reaction such as calcium acetate, barium acetate, strontium propionate, magnesium trichloracetate, calcium palmitate, magnesium stearate, barium oleate, calcium phthalate, beryllium acetate, radium formate, calcium levulinate, barium butyrate, strontium chloracetate, and like salts. The anhydrous salts are employed, i. e. they are devoid of water of crystallization.

The sulfates, halides and carbonates form a preferred group, and, of the halides the chlorides and bromides are particularly suited. The salts of barium, which are very active, make it the most preferred of the alkaline earth metals, although strontium salts also possess a preferred activity. In general, the activity increases in the direction of increasing atomic weight of the metals.

A number of salts were tested for catalytic activity by heating allyl acetate, a difficultly polymerizable ester, in their presence. The monomeric allyl acetate was substantially pure and anhydrous and to separate quantities were added an anhydrous normal salt of an alkaline earth metal as indicated in the table below in an amount of about 0.5%. The esters in the presence of the salts were refluxed or boiled at normal pressure in a vessel fitted with a reflux condenser and the course of the polymerization was followed by observation of the refractive index taken from time to time after starting the heating. The refractive index of the polymer, which was polyallyl acetate, is considerably higher than that of the monomer so that an increase of refractive index indicates that polymerization is occurring. A blank to which no salt was added was similarly heated for comparison. The values given in the body of the table are the increase in fourth decimal place units of the refractive index $$(\Delta n20/D \times 10^4)$$

for the indicated time from start.

Table

| Hours | Blank | MgCl² | CaCl² | SrCO³ | BaF² | BaCl² | Ba(NO³)² | Ba(OAc)² |
|---|---|---|---|---|---|---|---|---|
| 62 | | 8 | | | | | | |
| 64 | | | | | 68 | | | |
| 66 | | 16 | | | | | | |
| 79 | | | | | | | 78 | |
| 88 | | | | | 47 | | | |
| 93 | | | 31 | | | | | 51 |
| 115 | | | | | | | 69 | |
| 118 | | 16 | | | | | | |
| 178 | | | 24 | | 153 | | | |
| 182 | | 20 | | | | | | |
| 198 | | | | | | 153 | | |
| 202 | | | | | 54 | | | |
| 203 | | | 51 | | | | | 86 |
| 225 | | | | | | | | |
| 292 | | | 38 | | | | | |
| 294 | | 29 | | | | | | |
| 296 | | | | 92 | | | | 128 |
| 311 | | | | | | | 195 | |
| 388 | | | 145 | | | | | 177 |
| 411 | | 36 | | | | | | |
| 433 | | | | | | 239 | | |
| 504 | | | | 159 | | | | 203 |
| 528 | | 51 | | | | | | |
| 546 | | | | | | | 292 | |
| Average rate of increase in units per hour | 0.117 | 0.127 | 0.282 | 0.860 | 0.384 | 0.623 | 0.600 | 0.441 |

The increase in refractive index is approximately proportional to the rate of polymer formation at the substantially uniform temperature employed, and the results tabulated above indicate that while the heating of the allyl acetate in the absence of a catalyst slowly effects the polymerization of the ester, the rate of polymer formation is improved by the presence of the salts. The superior catalytic activity of the salts of metals of increasing atomic weight is also shown.

The compounds polymerized according to the process of the invention are unsaturated esters of a monocarboxylic acid and the esters contain a single olefinic bond. Although the salts catalyze polymerization of any polymerizable unsaturated compound, the esters employed are those of monocarboxylic acids devoid of any polymer-promoting group such as esters of acrylic acid, crotonic acid, cinnamic acid, etc. The esters are derived from a mono-unsaturated alcohol having an olefinic linkage between two carbon atoms one of which contains at least one hydrogen atom attached thereto and one of which is linked directly to a saturated carbon atom containing the hydroxyl group linked directly thereto. Preferably the ester is derived from a mono-unsaturated alcohol containing a vinylidene group directly linked to a saturated carbon atom to which is linked the hydroxyl group. Unsaturated esters of aromatic acids such as benzoic acid, toluic acid, and the like, are included within the purview of the invention since the lack of saturation of the carbon atoms in the aromatic ring of such compounds is responsible for no polymerizable unsaturated groups therein because of the well-known peculiarities of aromatic nuclei. The esters of saturated monocarboxylic acids constitute a preferred group, and, while esters of simple saturated acids are particularly preferred, also included are those esters of saturated aliphatic acids wherein one or more hydrogen atoms have been substituted by a halogen atom, a hydroxyl group, an alkoxy group, an aryloxy group and like groups. Among the preferred reactants are included such compounds as allyl formate, allyl acetate, allyl propionate, allyl isobutyrate, beta-methylallyl acetate, beta-chlorallyl acetate, beta-ethylallyl formate, beta-phenylallyl acetate, beta-methoxyallyl acetate, beta-chloromethylallyl acetate, allyl benzoate, beta-methylallyl propionate, allyl toluate, allyl salicylate, allyl glycolate, allyl methoxyacetate, beta-methylallyl chloracetate, allyl beta-chloropropionate, allyl lactate, allyl naphthenate, beta-methylallyl chlorobenzoate, allyl alpha-hydroxyisobutyrate, allyl acetylglycolate, allyl stearate, allyl levulinate, beta-methylallyl butyrate, alpha-methylallyl acetate, alpha-phenylallyl acetate, allyl ethoxyformate, beta-methylallyl phenoxyformate, allyl naphthoate, allyl ester of hydrogenated abietic acid, and the like.

The compounds of the preferred group may be represented by the general formula,

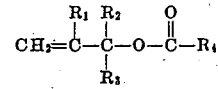

wherein $R_1$, $R_2$ and $R_3$ represent hydrogen atoms, halogen atoms or hydrocarbon radicals and $R_4$ represents a hydrogen atom or an organic radical devoid of a polymerizable unsaturated group, such as an alkyl group, an aryl group, an alicyclic group, an aralkyl group, an alkoxy group, an aryloxy group, and the like.

Less preferred esters include compounds like crotyl acetate, crotyl propionate, crotyl benzoate, 2-hexenyl acetate, 2-pentenyl formate, 2-isopentenyl chloracetate, methyl isobutenyl carbinyl butyrate, and similar types of ester.

The polymerization is effected by heating the unsaturated ester under anhydrous conditions in the presence of or in contact with the catalyst salts at a temperature of 50° C. to 150° C. with the ester in the liquid phase. With unsaturated esters of sufficiently low melting point so that they are liquid under the reaction conditions, the ester is polymerized in the process per se. The use of higher esters requires the use of an inert solvent in order to have the reaction mixture liquid under the conditions prevailing in effecting the polymerization. For this purpose solvents such as saturated esters like ethyl acetate, isopropyl acetate, butyl acetate, etc.; hydrocarbons like benzene, toluene, hexane, octanes, etc.; ethers like dioxane, dibutyl ether, beta-dichlorodiethyl ether, etc., are admixed with the unsaturated ester subjected to polymerization. In general, however, it is preferred to avoid the use of solvents or diluents where possible since they complicate the recovery problem in obtaining the polymer and decrease the rate of the polymerization reactions. It is preferred to employ as reactant an unsaturated ester which is liquid under the reaction conditions as is realized with lower esters or esters of lower unsaturated alcohols. These preferred reactants contain not more than seven carbon atoms in the unsaturated ester.

While the salts employed as catalyst dissolve to a greater or lesser extent in the reaction material, they are normally soluble in only minute amounts so that the reaction mixture is contacted with the catalyst as a crystalline substance. For this reason it is preferable to utilize the salt in the finely divided or comminuted state. Amounts of catalyst from a few hundredths of 1% to 5% or more are effective in catalyzing the reactions.

The normal salts of alkaline earth metals have advantages in polymerizing the unsaturated esters not realized with known peroxidic catalysts such as benzoyl peroxide, one of the most commonly used materials for this purpose. The salts are cheap and this is true of the most active of them, the barium salts. Since they are essentially insoluble in the reaction mixture, the polymer obtained is not contaminated with undesirable materials such as benzoic acid as when benzoyl peroxide is utilized. Further, upon completion of the polymerization operation, the catalyst is filtered from the reaction mixture and can be used again in the process. In view of these advantages it is evident that catalyst cost according to the present invention is reduced to a minimum.

In executing the process of the invention the unsaturated ester to which has been added an amount of catalyst is heated to between 50° C. and 150° C., and the heating continued until the desired degree of polymerization has occurred. The polymers of the unsaturated esters are linear polymers which are generally soluble in the monomeric material. After 25% to 35% or more of the reactant has been converted to polymer, as may be determined by observation of increase of the refractive index, the heating is discontinued and the reaction material filtered to remove catalyst. The filtered material is then subjected to distillation to separate unreacted monomer, the polymers remaining as residue. If desired, any trace of catalyst salt or other material retained by the polymer is removed by water-washing. It is usually desirable to choose a reactant which will boil within the range of reaction temperature whereby the polymerization is effected by refluxing the material in the presence of the catalyst. The presence or absence of oxygen appears to have no significant effect on the rate of the polymerization reaction when the catalysts of the present invention are employed. In some cases it is desirable to add intermittently fresh catalyst to the reaction material during the course of the heating rather than adding the entire amount at the start.

Another method of effecting the reaction which is adapted for continuous production of polymer with the catalyst salts is to pass the liquid reactant material through a bed of the salt. In adapting this procedure to continuous operation the organic material is circulated through a bed of the catalyst maintained at the desired temperature and monomeric ester is fed into the cycling system while material is withdrawn therefrom, the withdrawn portion being a mixture of polymer and monomer from which the monomer is recovered for return to the cycling system.

The polymers prepared according to the invention have application as plasticizers and softeners for various materials. Further, their solubility in various substances makes the polymeric esters useful intermediates in the synthesis of polymeric alcohols which may be prepared by hydrolysis or saponification of the polymers.

We claim as our invention:

1. A process for the production of a polyallyl acetate which consists of heating allyl acetate in the liquid phase under anhydrous and non-oxidizing conditions in the presence of a barium chloride for a time sufficient to effect appreciable polymerization of the allyl acetate.

2. A process for the production of polyallyl acetate which consists of boiling allyl acetate at atmospheric pressure under anhydrous and non-oxidizing conditions in the presence of a barium carbonate for a time sufficient to effect appreciable polymerization of the allyl acetate.

3. A process for the production of polyallyl acetate which consists of boiling allyl acetate at atmospheric pressure under anhydrous and non-oxidizing conditions in the presence of strontium carbonate for a time sufficient to effect appreciable polymerization of the allyl acetate.

4. A process for the production of a polymer of a mono-olefinic ester of a monocarboxylic acid and a monohydric alcohol having an olefinic linkage between two aliphatic carbon atoms one of which has at least one hydrogen atom linked directly thereto and the other of which is linked directly to a saturated carbon atom having the hydroxyl group linked directly thereto, which ester contains only double-bonded unsaturation and no other elements than carbon, hydrogen, oxygen and halogen, which consists of heating said ester under anhydrous and non-oxidizing conditions at a temperature of from 50° C. to 150° C. in the presence of a neutral alkaline earth metal salt of a non-peroxy acid, said heating being continued for a time sufficient to effect appreciable polymerization of said ester.

5. A process for the production of a polymer of a mono-olefinic ester of a monocarboxylic acid and a monohydric alcohol having a vinylidine group linked directly to a saturated carbon atom to which is directly linked the hydroxyl group, which ester contains only double-bonded unsaturation and no other elements than carbon, hydrogen, oxygen and halogen, which consists of heating said ester under anhydrous and non-oxidizing conditions at a temperature of from 50° C. to 150° C. in the presence of a neutral alkaline earth metal salt of a non-peroxy acid, said heating being continued for a time sufficient to effect appreciable polymerization of said ester.

6. A process for the production of a polymer of a mono-olefinic ester of a monocarboxylic acid and a monohydric alcohol having a vinylidene group directly linked to a saturated carbon atom to which is directly linked the hydroxyl group, which ester contains only double-bonded unsaturation and no other elements than carbon, hydrogen, oxygen and halogen, which consists of heating said ester in liquid phase under anhydrous and non-oxidizing conditions at a temperature of from 50° C. to 150° C. in the presence of a neutral alkaline earth metal halide, said heating being continued for a time sufficient to effect appreciable polymerization of said ester.

7. A process for the production of polymer of an allyl ester of a saturated monocarboxylic acid which consists of heating said ester in liquid phase under anhydrous and non-oxidizing conditions at a temperature of from 50° C. to 150° C. in the presence of a neutral alkaline earth metal salt of a non-peroxy acid, said heating being continued for a time sufficient to effect appreciable polymerization of said ester.

8. A process for the production of a polymer of an allyl ester of saturated monocarboxylic acid which ester contains not more than 7 carbon atoms, which consists of heating said ester in liquid phase under anhydrous and non-oxidizing conditions at a temperature of from 50° C. to 150° C. in the presence of a neutral alkaline earth metal halide, said heating being continued for a time sufficient to effect appreciable polymerization of said ester.

9. A process for the production of a polymer of an allyl ester of a saturated monocarboxylic acid which ester contains not more than 7 carbon atoms, which consists of heating said ester in liquid phase under anhydrous and non-oxidizing conditions at a temperature from 50° C. to 150° C. in the presence of a barium dihalide for a time sufficient to effect appreciable polymerization of said ester.

DAVID E. ADELSON.
HAROLD F. GRAY, Jr.
ROBERT P. RUH.